(12) United States Patent
Bailiang et al.

(10) Patent No.: US 10,506,393 B2
(45) Date of Patent: *Dec. 10, 2019

(54) METHOD OF DISPLAYING LOCATION OF A DEVICE

(71) Applicant: Google LLC, Mountain View, CA (US)

(72) Inventors: Zhou Bailiang, Sydney (AU); Judith Shade, Tokyo (JP); David Robert Gordon, Tokyo (JP)

(73) Assignee: Google LLC, Mountain View, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/949,271

(22) Filed: Apr. 10, 2018

(65) Prior Publication Data

US 2018/0234819 A1    Aug. 16, 2018

Related U.S. Application Data

(63) Continuation of application No. 14/083,799, filed on Nov. 19, 2013, now Pat. No. 9,973,900.

(60) Provisional application No. 61/730,247, filed on Nov. 27, 2012.

(51) Int. Cl.
| | |
|---|---|
| *G06F 3/0482* | (2013.01) |
| *H04W 4/33* | (2018.01) |
| *H04W 4/029* | (2018.01) |
| *H04W 4/04* | (2009.01) |
| *H04W 4/30* | (2018.01) |

(52) U.S. Cl.
CPC ............ *H04W 4/33* (2018.02); *H04W 4/029* (2018.02); *H04W 4/043* (2013.01); *G06F 3/0482* (2013.01); *H04W 4/04* (2013.01); *H04W 4/30* (2018.02)

(58) Field of Classification Search
CPC ....... H04W 4/33; H04W 4/029; H04W 4/043; H04W 4/30; H04W 4/04; G06F 3/0482
See application file for complete search history.

(56) References Cited

U.S. PATENT DOCUMENTS

| | | |
|---|---|---|
| 7,126,951 B2 | 10/2006 | Belcea et al. |
| 7,954,070 B2 | 5/2011 | Plocher et al. |
| 8,947,421 B2 | 2/2015 | Uetabira |
| (Continued) | | |

OTHER PUBLICATIONS

Arto Puikkonen et al., "Towards Designing Better Maps for Indoor Navigation—Experiences from a Case Study", Nov. 2009, ACM MUM '09.

*Primary Examiner* — Andrew T Chiusano
(74) *Attorney, Agent, or Firm* — Lerner, David, Littenberg, Krumholz & Mentlik, LLP

(57) ABSTRACT

A system and method are provided that display search results and user location on a map. A floor selector interface may be displayed with the map. The floor selector interface may include one or more floor selectors, each of which correspond to a floor in a multi-story building. Upon selection of a floor selector, first search result and location indicators may be displayed transparently or semi-transparently to indicate whether the user or the search results are on the selected floor. If the user or the search results are on a non-selected floor, such indicators may be displayed differently, such as with a different transparency. The floor selector interface may also include second search result and location identifiers. Such second identifiers may be displayed at particular floor selectors corresponding to the present elevation of the user and search results, respectively.

20 Claims, 11 Drawing Sheets

(56) References Cited

U.S. PATENT DOCUMENTS

| | | |
|---|---|---|
| 9,052,376 B2 | 6/2015 | Kainulainen et al. |
| 9,349,128 B1 | 5/2016 | Kerr et al. |
| 9,529,925 B2 | 12/2016 | Bailiang et al. |
| 2006/0031214 A1 | 2/2006 | Solaro et al. |
| 2009/0109216 A1 | 4/2009 | Uetabira |
| 2011/0161855 A1 | 6/2011 | Prehofer |
| 2012/0270573 A1 | 10/2012 | Marti et al. |
| 2012/0297346 A1 | 11/2012 | Hoffknecht et al. |
| 2013/0047120 A1 | 2/2013 | Albright |
| 2013/0054573 A1 | 2/2013 | Snellman et al. |
| 2013/0131973 A1 | 5/2013 | Friedler et al. |
| 2014/0094232 A1 | 4/2014 | Framel et al. |
| 2015/0130788 A1 | 5/2015 | Bailiang |
| 2015/0281910 A1 | 10/2015 | Choudhury et al. |

METHOD OF DISPLAYING LOCATION OF A DEVICE

CROSS-REFERENCE TO RELATED APPLICATIONS

The present application is a continuation of U.S. patent application Ser. No. 14/083,799, filed Nov. 19, 2013, which claims the benefit of the filing date of U.S. Provisional Patent Application No. 61/730,247, filed Nov. 27, 2012, the disclosures of which are hereby incorporated herein by reference.

BACKGROUND

In existing systems, conventional printed and digital maps may be limited to conventional two-dimensional displays. Such conventional maps may provide the location of a device and a location of one or more search results, but may lack an intuitive way to display elevation information in a two-dimensional display.

BRIEF SUMMARY

One aspect of the disclosures provides a method of displaying a location of a device, including: determining the location of a device, the location including elevation information; generating, via a processor, a first location identifier, the first location identifier corresponding to the location of the device; displaying a first location identifier in a map, the first location identifier corresponding to the location of the device, wherein the first location identifier is displayed at a predetermined transparency based on a current selection of a floor selector interface; generating, via a processor, a second location identifier, the second location identifier corresponding to the location of the device; and displaying a second location identifier in the floor selector interface, the second location identifier having a common characteristic with the first location identifier.

In one example, the map is either a two-dimensional map or a three-dimensional map.

In one example, the elevation information includes a floor of a multi-story building.

In one example, the common characteristic is color.

In one example, the map includes an indoor floor plan.

In one example, the floor selector interface includes a plurality of floor selectors, each corresponding to a floor of a multi-story building.

In one example, the method may further include: changing the current selection of the floor selector interface and subsequently changing the transparency of the first location identifier.

In one example, the first location identifier corresponds to a floor selected at the floor selector interface and is displayed non-transparently.

In one example, the first location identifier corresponds to a floor not selected at the floor selector interface and is displayed semi-transparently.

In one example, the method may further include scanning through the plurality of floor selectors in response to a gesture input.

Another aspect of the disclosure provides a system for displaying a location of a device, including: a processor; and a memory coupled to the processor, the memory including instructions capable of causing the processor to: determine the location of a device, the location including elevation information; generate, via a processor, a first location identifier, the first location identifier corresponding to the location of the device; display a first location identifier in a map, the first location identifier corresponding to the location of the device, wherein the first location identifier is displayed at a predetermined transparency based on a current selection of a floor selector interface; generate, via a processor, a second location identifier, the second location identifier corresponding to the location of the device; and display a second location identifier in the floor selector interface, the second location identifier having a common characteristic with the first location identifier.

In one example, the map is either a two-dimensional map or a three-dimensional map.

In one example, the elevation information includes a floor of a multi-story building.

In one example, the common characteristic is color.

In one example, the map includes an indoor floor plan.

In one example, the floor selector interface includes a plurality of floor selectors, each corresponding to a floor of a multi-story building.

In one example, the processor is further configured to change the current selection of the floor selector interface and subsequently change the transparency of the first location identifier in response to a user input.

In one example, the first location identifier corresponds to a floor selected at the floor selector interface and is displayed non-transparently.

In one example, the first location identifier corresponds to a floor not selected at the floor selector interface and is displayed semi-transparently.

In one example, the processor is further configured to scan through the plurality of floor selectors in response to a gesture input.

Another aspect of the disclosure provides a method of displaying a location of a device, including: determining the location of a device, the location including elevation information; generating, via a processor, a first location identifier, the first location identifier corresponding to the location of the device; selecting a first floor selector at a floor selector interface in response to a user input; displaying the first location identifier in a non-transparent state, the first location identifier corresponding to the first floor selector; selecting a second floor selector at the floor selector interface in response to user input; and displaying the first location identifier in a semi-transparent state.

DETAILED DESCRIPTION

According to aspects of the disclosure, methods of visualizing search results and user location on a map are provided. In one example, a floor selector interface may be displayed along with the map information. The floor selector interface may include one or more floor selectors, each of which corresponds to a floor in a multi-story building. A user may scan or scroll through the floor selectors and select a given floor of a building. Upon selection, first search result and location indicators may be displayed transparently or semi-transparently to indicate whether the user or the search results are on the selected floor. If the user or the search results are on a non-selected floor, such indicators may be displayed differently, such as with a different transparency. The floor selector interface may also include second search result and location identifiers. Such second identifiers may be displayed at particular floor selectors corresponding to the present elevation of the user and search results, respectively.

Figure 1:
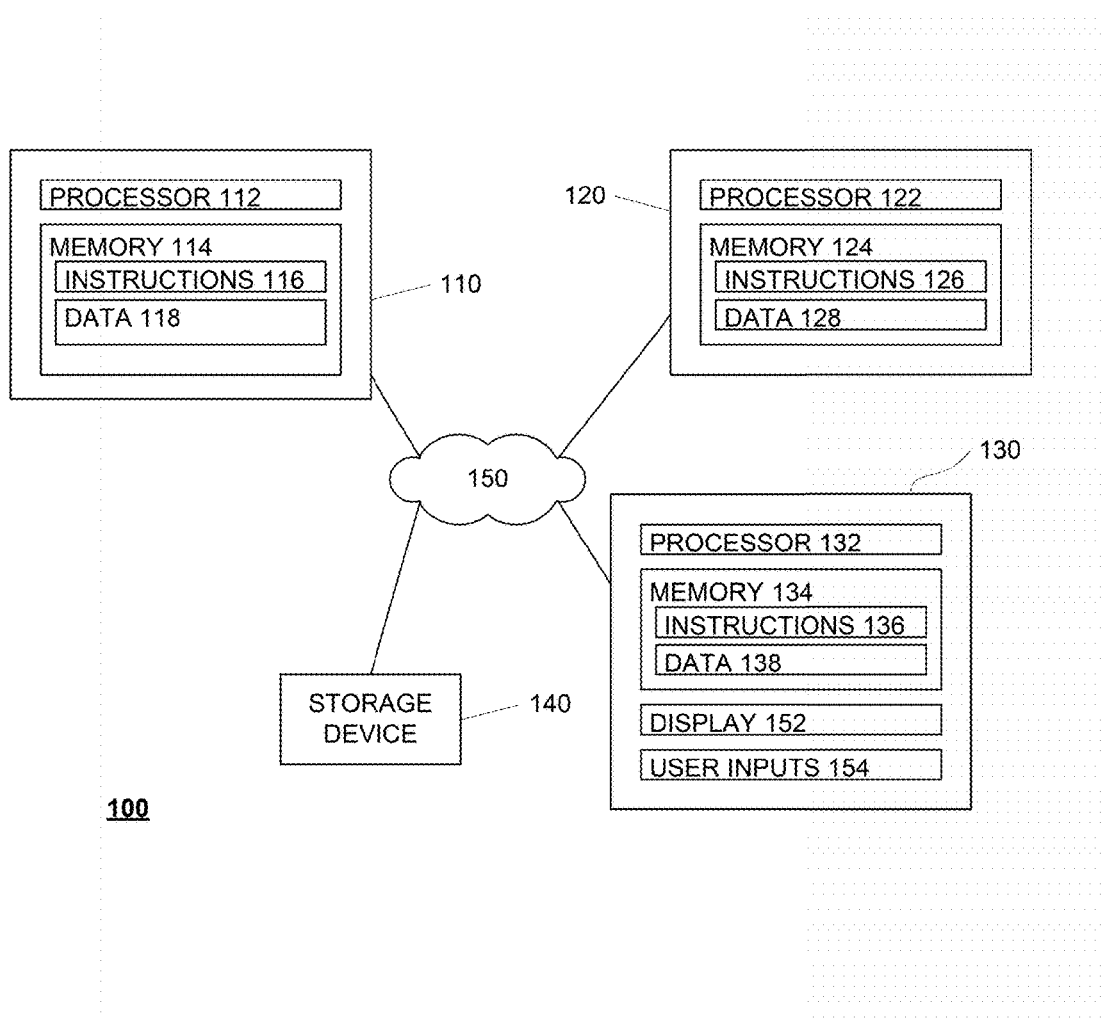
FIG. 1 is a functional diagram of a system in accordance with aspects of the disclosure.
Figure 2:
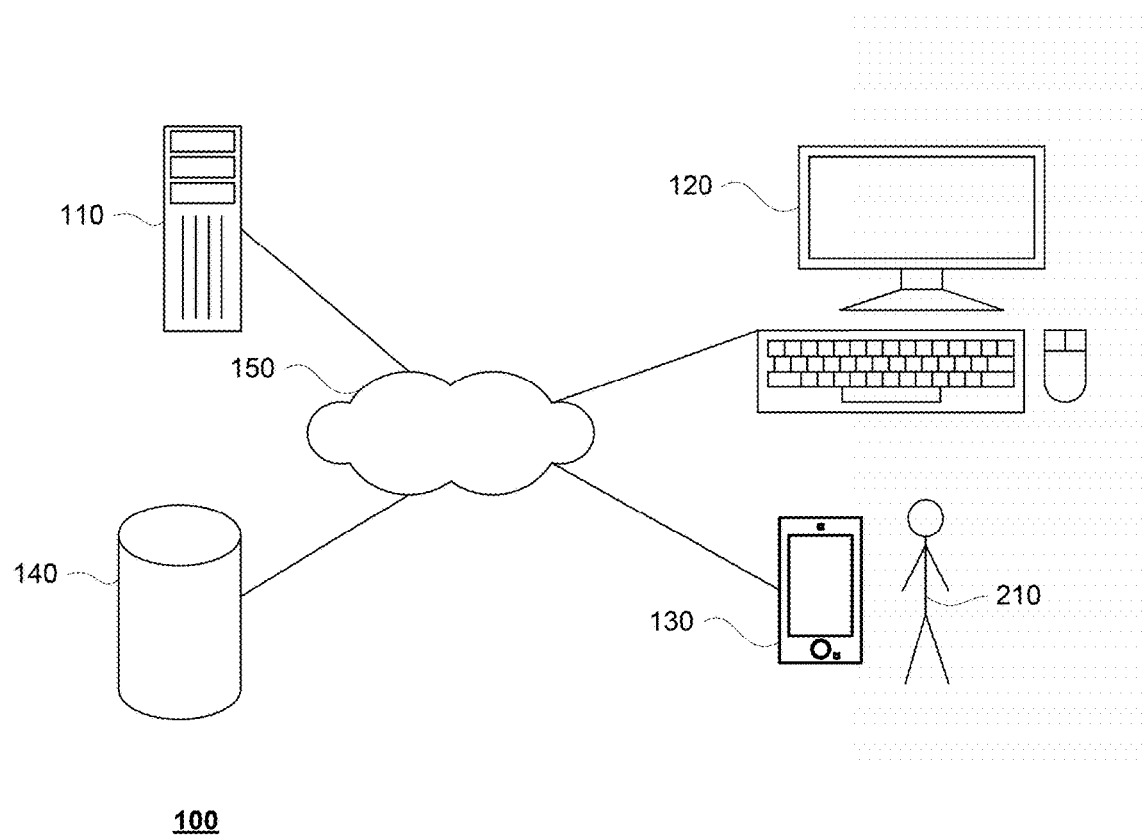
FIG. 2 is a pictorial diagram of the system of FIG. 1.

As shown in FIGS. 1-2, an exemplary system 100 may include devices 110, 120, 130, and 140. Device 110 may include a computer having a processor 112, memory 114 and other components typically present in general purpose computers. Memory 114 of computer 110 stores information accessible by processor 112, including instructions 116 that may be executed by the processor 112.

Memory also includes data 118 that may be retrieved, manipulated or stored by the processor. The memory may be of any type capable of storing information accessible by the processor, such as a hard-drive, memory card, ROM, RAM, DVD, CD-ROM, write-capable, and read-only memories.

The instructions 116 may be any set of instructions to be executed directly (such as machine code) or indirectly (such as scripts) by the processor. In that regard, the terms "instructions," "application," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 118 may be retrieved, stored or modified by processor 112 in accordance with the instructions 116. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The processor 112 may be any processor, such as commercially available CPUs. Alternatively, the processor may be a dedicated device such as an ASIC or other hardware-based processor. Although FIG. 1 functionally illustrates the processor, memory, and other elements of computer 110 as being within the same block, the processor, computer, or memory may actually comprise multiple processors, computers, or memories that may or may not be stored within the same physical housing. In this regard, the memory may be a hard drive or other storage media located in a housing different from that of computer 110. For example, all or portions of data 118 may actually refer to storage associated with another device, such as storage device 140 at another network location. Storage device 140 may include a database, hard drive, server or other storage system that is accessible by server 110.

The computer 110 may be at one node of a network 150 and capable of directly and indirectly communicating with other nodes, such as devices 120, 130, and 140 of the network. For example, computer 110 may comprise a web server that is capable of receiving data from devices 120, 130 and 140 via network 150 such that computer 110 may use network 150 to transmit and display information to a user.

Although the examples of FIGS. 1 and 2 depict only a few devices, computer 110 may be in communication with a plurality of different devices. Moreover, devices and computers in accordance with the systems and methods described herein may comprise any device capable of processing instructions and transmitting data to and from humans and other computers including general purpose computers, personal digital assistants (PDAs), network computers lacking local storage capability, set-top boxes for televisions, and other networked devices.

Although some functions are indicated as taking place on a single computer having a single processor, various aspects of the system and method may be implemented by a plurality of computers, for example, communicating information over network 150. In this regard, computer 110 may also include a web server capable of communicating with the client devices 120 and 130 as well as storage device 140. Server 110 may also include a plurality of computers (e.g., a load balanced server farm), that exchange information with different nodes of a network for the purpose of receiving, processing and transmitting data to the client devices. In this instance, the client devices will typically still be at different nodes of the network than any of the computers comprising server 110. Accordingly, references to a processor, computer, or memory will be understood to include references to a collection of processors, computers, or memories that may or may not operate in parallel.

The network 150 and intervening nodes described herein, may be interconnected via wires and/or wirelessly using various protocols and systems, such that each may be part of the Internet, World Wide Web, specific intranets, wide area networks, or local networks. These may use standard communications protocols or those proprietary to one or more companies, Ethernet, WiFi, HTTP, ZigBee, Bluetooth, infra-red (IR), etc., as wells various combinations thereof.

Devices 120 and 130 may include a client device configured to allow a user to communicate with server 110 and perform other tasks. In this regard, client devices 120 and 130 may be configured similarly to the computer 110, with processors 122, 132, memory 124, 134, instructions 126, 136, and data 128, 138, each similar to processor 112, memory 114, instructions 116, and data 118, respectively.

In one example, client device 130 may be a personal computer, intended for use by a user 210, having all the components normally found in a personal computer. Such components may include, for example, a central processing unit 132 (CPU), display device 152, CD-ROM, hard-drive, one or more user inputs 154, camera, speakers, modem and/or network interface device, and all of the components used for connecting these elements to one another. The display device 152 may include a monitor having a screen, a projector, a touch-screen, a small LCD screen, a television, or another device such as an electrical device that is operable to display information processed by the processor. The user inputs 154 may include a mouse, keyboard, touchscreen (for example, as part of display device 152), microphone, etc. In this regard, a user may input information into client device 130 via user inputs 154, and the input information may be transmitted by CPU 132 to computer 110. By way of example only, client device 130 may be any such devices as a laptop computer, media player, e-book readers, smartphone, PDA, cellular or mobile phone, tablet computer, handheld device, or any other suitable device or combination of devices.

The memory 134 may store information accessible by the processor 132, such as instructions 136, and data 138 such as map data, that may be executed or otherwise used by the processor 132 to display the geographic location of the device 130 on a map. The device 130 may also receive its geographic coordinates from one or more geographic positioning systems, such as GPS, the Global Navigation Satellite System ("GLONASS"), and other such systems. Based on the coordinates received from these geographic positioning systems, the device may determine its latitude, longitude, and/or altitude. In this manner, as the device changes location, such as by being physically moved, a new current location of the device may be determined.

Figure 3A:
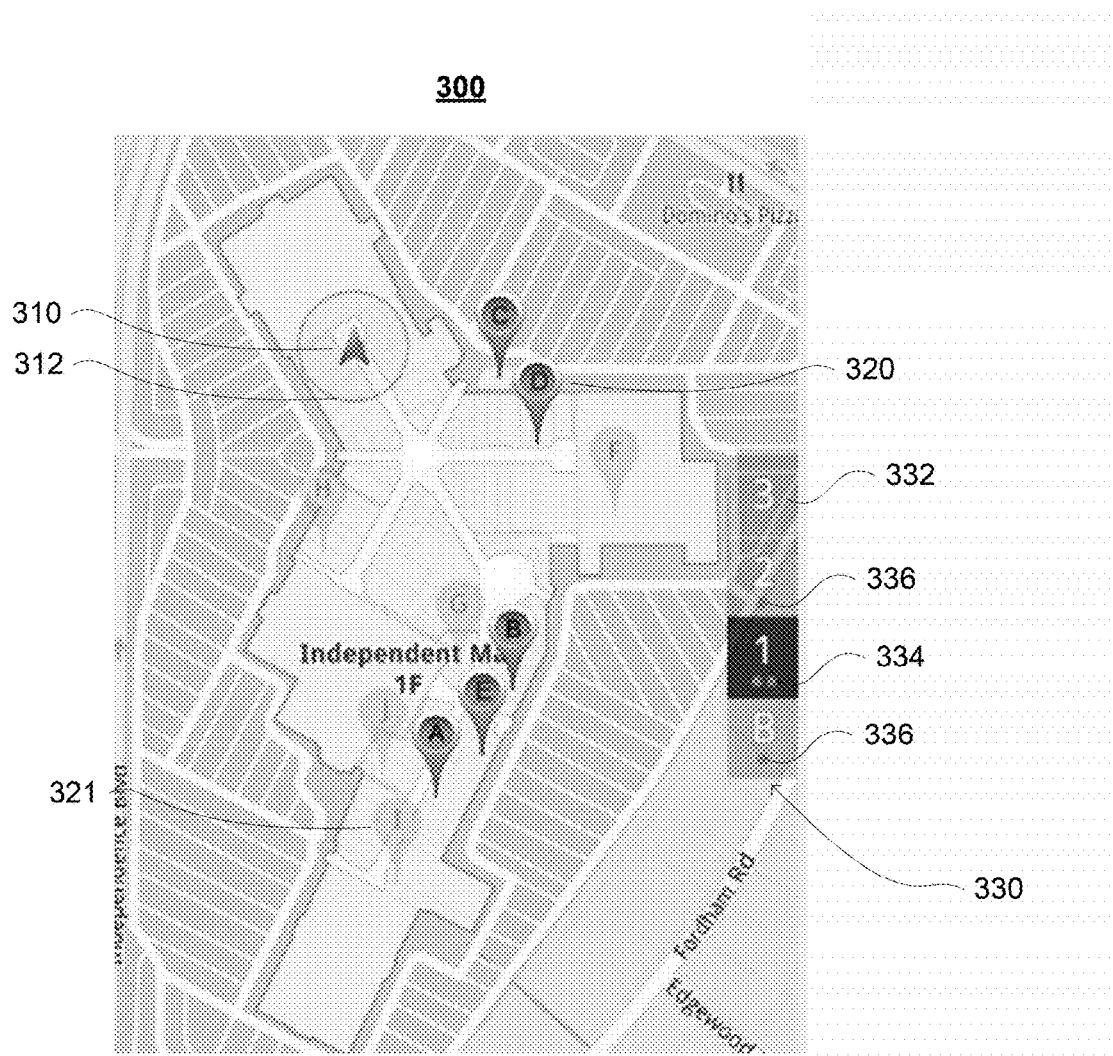
FIGS. 3A and 3B are pictorial diagrams of a map according to aspects of the disclosure.

The map data described above may include indoor floor plans. Such indoor floor plans may represent a layout of a particular floor in the interior of a building, such as a multi-story building, an example of which is shown in FIG. 3A. Such indoor floor plans may be stored at the computer 110 and provided to any devices 120-150 via the network 150. The indoor floor plans may be generated according to various techniques. By way of example, such floor plans may be provided to the computer 110 according to any number of file formats, such as, for example, any type of image file. Such floor plans may then be aligned with the known coordinates and boundaries of the building in order to achieve alignment of the indoor map and landmarks within the building.

The device may also determine its position based on other signals that the device 130 may receive, such as signals from one or more wireless network access points, signals from one or more cellular towers, or other such signals. For example, the location with respect to the indoor floor plan may be determined. In one example, the physical area corresponding to the indoor floor plan may include one or more wireless access points disposed therein. Such wireless access points may be WiFi, near-field communication, or the like. A location of the device with respect to the indoor floor plan may be identified by the device according to known signal strengths of nearby wireless access points.

The device 130 may also include components to determine its orientation. Such orientation components may include an accelerometer, gyroscope, compass, magnetometer or any combination of these components. The orientation components may detect various forces acting on the device. For example, where the orientation components include an accelerometer, the accelerometer may to detect the effect of gravity on the device and may be measured, e.g., in meters per second. The processor may use input from the orientation components, such as the accelerometer, to determine the device's pitch, yaw or roll (or changes thereto) relative to the direction of gravity or a plane perpendicular thereto.

Figure 3B:
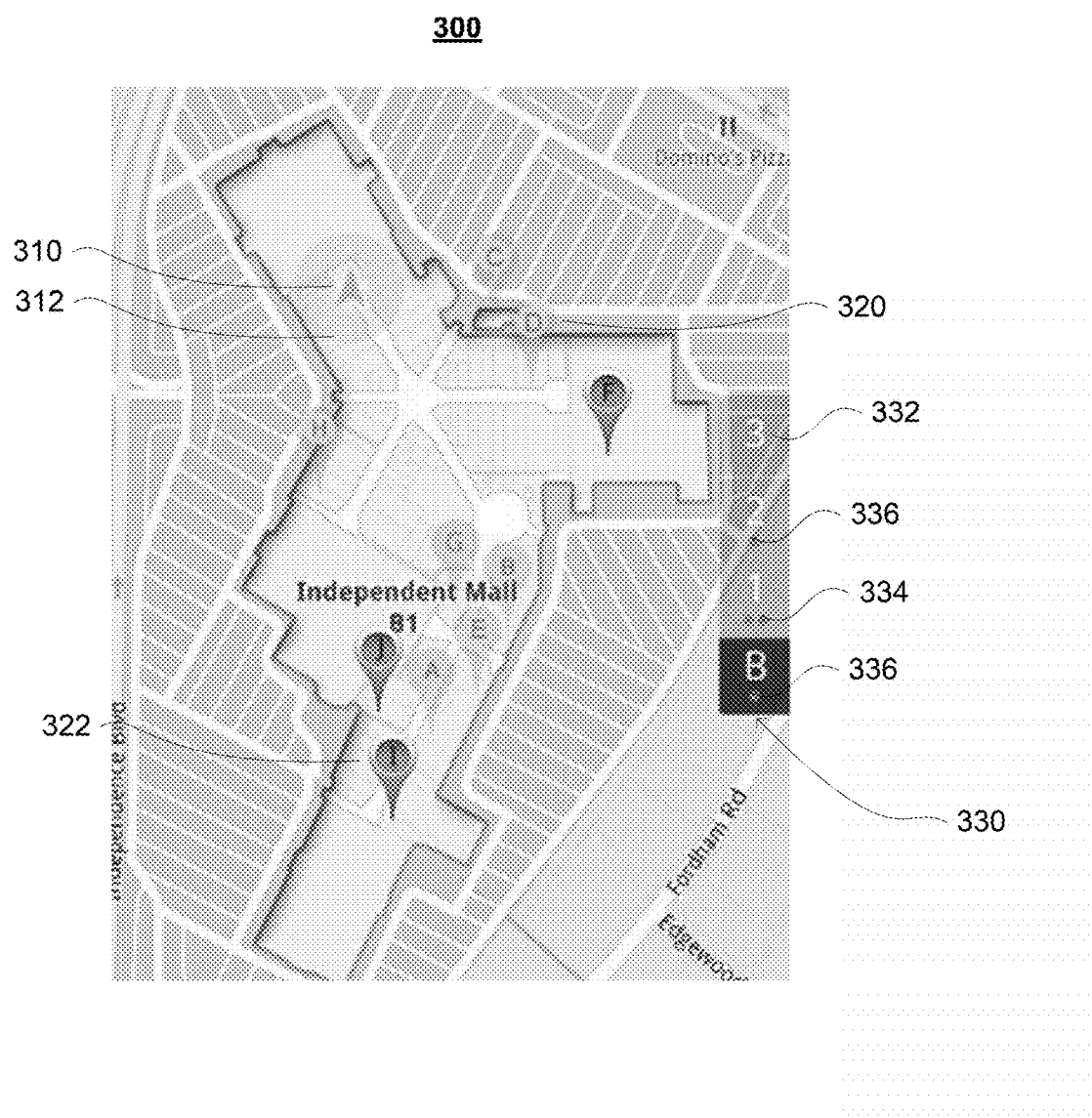

FIGS. 3A and 3B are pictorial views of an example map 300 according to one aspect of the disclosure. The map 300 may be displayed by any type of device, such as, for example, by the respective displays of any of the devices 120-140 described above. The data used to display the map may be stored in the memory of the device or may be downloaded from another device via the network 150.

Figure 4A:
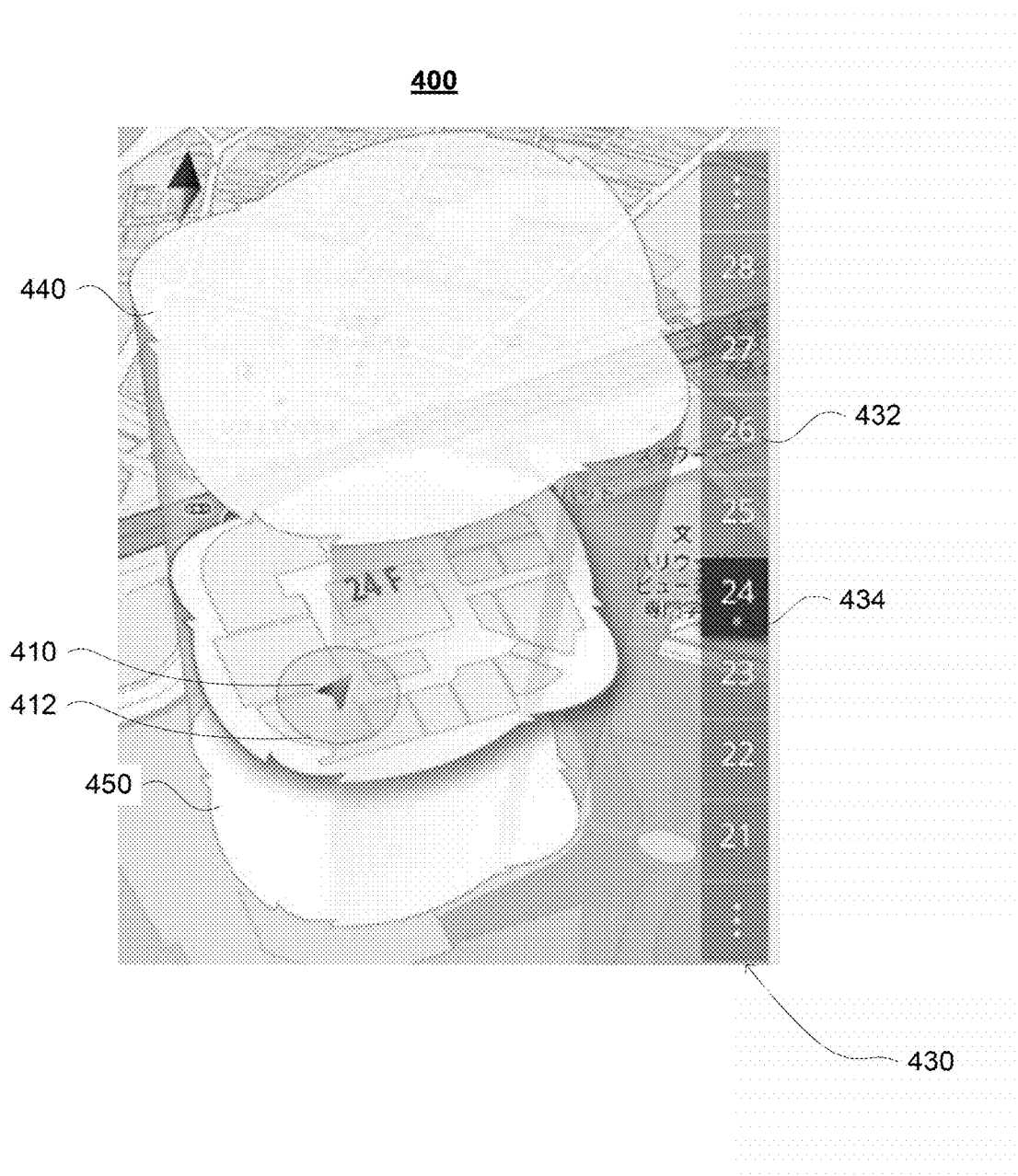
FIGS. 4A and 4B are pictorial diagrams of a map according to aspects of the disclosure.
Figure 4B:
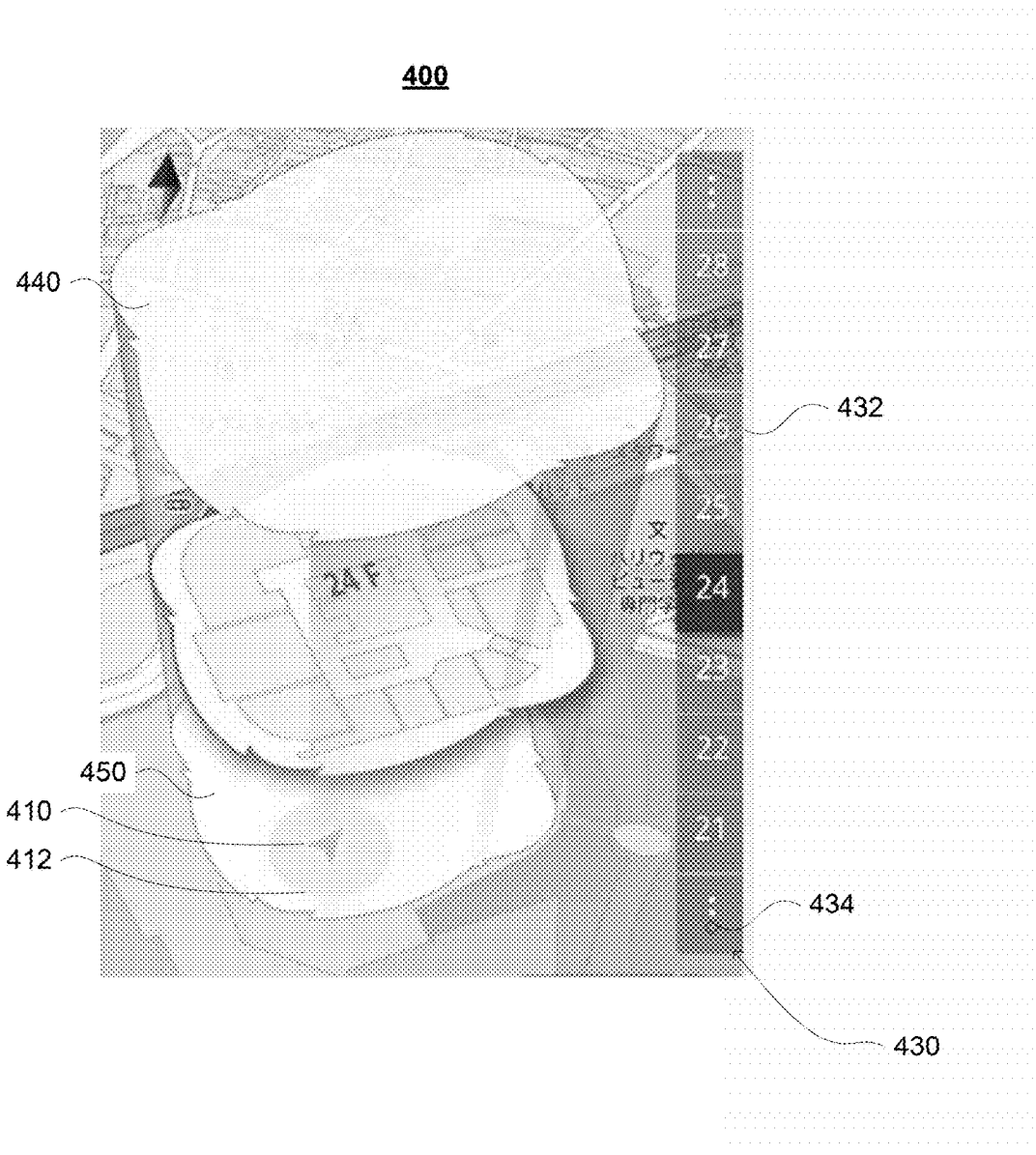

The map 300 may display any type of map information, such as building outlines, street names, building names, business names, indoor floor plans, etc. While FIG. 3A shows a two-dimensional plan view of a map, a three-dimensional perspective view of a map may also be displayed, as shown in FIGS. 4A-4B.

A first location identifier 310 is displayed on the map 300, as shown in FIG. 3A. The first location identifier 310 may be displayed on the map 300 to correspond to a physical location of the device. The first location identifier 310 may be any shape, and in certain examples may have an arrow or a chevron shape. In this example, the direction of the shape may correspond to a current direction or orientation of the device. The first location identifier 310 may also have any color, shading or patterns thereof, and in one example may be blue. A location range identifier 312 may also be displayed in the vicinity of the first location identifier 310. The location range identifier 312 relates to a certainty with which the first location identifier 310 corresponds to the actual physical location of a device and may represent a possible range of locations based on the certainty.

One or more search result identifiers 320 may also be displayed on the map 300. The search result identifiers 320 may be displayed on the map 300 according to the location of the corresponding search result. In one example, a plurality of search result identifiers 320 may be displayed on the map 300 in response to a search query (not shown), as shown in FIG. 3A. The search result identifiers 320 may be labeled in any way, and in one example may be labeled alphabetically for identification in a corresponding list.

A floor selector interface 330 may also be displayed on the map 300. In one example, the floor selector interface 330 may be displayed at the periphery of the map 300. The floor selector interface 330 may extend at least partially or completely between opposing edges of the map 300, and in one example may extend at least partially between a top edge and a bottom edge of the map 300 such that the floor selector interface 330 extends vertically on the viewable portion of the display. The vertical arrangement of the floor selector interface may correspond to the vertical nature of the floors in a multi-story building, allowing a user to realize a correspondence between the two.

The floor selector interface 330 may include one or more floor selectors 332. Each of the floor selectors 332 may be approximately square and may be oriented adjacent to one another. In this regard, the floor selector interface 330 may include more than one floor selector 332, each of which may be disposed adjacent, or immediately adjacent, each other. In this regard, the floor selector interface 330 may be generally rectangular. In one example, the floor selector interface 330 may include up to ten floor selectors 332. Each of the floor selectors 332 may correspond to a respective floor of a multi-story building currently displayed by the map 300. For example, if a multi-story building displayed by the map 300 includes three floors, as well as a basement level, the floor selectors may display the alphanumeric characters B, 1, 2, and 3, as shown in the example of FIG. 3A.

In some examples where a multi-story building includes more than eight floors, some of the floor selectors 332 may display other characters or identifiers to indicate the existence of additional floors not currently displayed by the floor selector interface 330. As shown in FIGS. 4A and 4B, the top and bottom floor selectors 322 may display upper and lower floor indicators, e.g., symbols indicating the existence of floors above and/or below the displayed floor selectors. In one example, the upper and lower floor indicators may be a vertical ellipsis, e.g., a vertical arrangement of dots.

Returning to FIG. 3A, each of the floor selectors 332 may appear transparent or semi-transparent on the map 300. In this regard, elements appearing on the map 300 that overlap with the floor selector interface 330 may remain visible to a user. The transparency, or semi-transparency, may be any transparency percentage in the range of 0% to 100%. A user may select one of the displayed floor selectors 332. This may be performed, for example, by a gesture input to a touch sensitive screen, or any other type of input method. Once selected, the floor selector 332 may undergo a transformation to indicate that it has been selected. Such transformation, for example, may include modifying the transparency percentage of the floor selector 332 or modifying the color of the floor selector 332, as shown in FIG. 3A at the floor selector 332 corresponding to floor 1. Once selected, the indoor floor plan corresponding to the selected floor may be displayed at the map 300, for example, within an outline of the multi-story building. In this regard, businesses and stores located on the selected floor may now be displayed to and visible to a user on the map 300.

A user may navigate among the floors of the multi-story building in the map 300 using the floor selector interface 330 via gesture input. As mentioned above, a user may select a floor selector 322 by providing touch input to the desired floor selector 322. In addition, a user may provide touch input to the upper and lower floor indicators. Such touch input may be either a short touch input, such as a tap, or long touch input, such as a tap and hold. A tap input may cause the displayed floors to scan in the direction of the upper floors or lower floors, depending on which indicator is tapped. For example, if a user provides a tap to the upper floor indicator, the displayed floors may go from 21-28 to 24-31. In this example, a short tap caused the floors to scan by three floors. In other examples, a tap may be associated with a scan of any number of floors either greater or less than three. In another example, a user may press and hold either the upper or lower indicator, as described above. In this example, a press and hold may result in a continuous scan of the floors until the input is released. For example, if a user presses and holds the upper floor indicator, the floors may scan upward at a predetermined rate toward higher floors.

In another example, a swipe input provided to the floor selector interface 330 may also cause displayed floors to be scanned. For example, if a user provides an up-to-down swipe (e.g., downward) to the floor selector tool 330, the floor selector tool 330 may scan toward floors above the currently displayed floors. The speed of the scan may correspond to the relative speed of the swipe. In the same way, a down-to-up swipe (e.g., upward) may cause the floor selector interface to scan toward floors below the currently displayed floors.

The floor selector interface 330 may also include a second location identifier 334. The second location identifier 334 may be displayed at a particular floor selector 332, as shown in FIG. 3A. The existence of the second location identifier 334 at a particular floor selector 332 indicates the device's elevation in the multi-story building, e.g., that the device is located on that particular floor. Accordingly, the lack of the second location identifier at a particular floor selector 332 may indicate that the device is not on that particular floor. As shown in FIG. 3A, the second location identifier 334 is displayed at the floor selector 332 corresponding to floor 1. This indicates that the user's device is currently located on floor 1 of the building. As the device traverses the various floors of a multi-story building, the floor selector interface 330 may update to reflect the current elevation of the device. For example, if a user takes an elevator or stairs from floor 1 to floor 2 while holding the device, the second location identifier 334 may move to the floor selector 332 corresponding to floor 2.

The second location identifier 334 may by any shape, and in one example may be a circle. The second location identifier 334 may also be any color, and in one example may be blue. The second location identifier 334 may share a common characteristic with the first location identifier 310. In this way, a user may easily identify a correspondence between the two and understand that both the first and second location identifiers 310 and 334 provide information regarding current location of the device.

The floor selector interface 330 may also include one or more second search result identifiers 336. The second search result identifiers 336 may be displayed at one or more particular floor selectors 332, as shown in FIG. 3A. The existence of the second search result identifiers 336 at a particular floor selector 332 indicates that search results are located on that particular floor.

The second search result identifiers 336 may be any shape, and in one example may be a circle. The second search result identifiers 336 may also be any color, and in one example may be red. The second search result identifiers 336 may share a common characteristic with the first search result identifiers 320. In this way, a user may easily identify a correspondence between the two and understand that both provide information relating to the location of search results.

In addition to the operations described below and illustrated in the figures, various operations will now be described. The following operations do not have to be performed in the precise order described below. Rather, various steps may be handled in a different order or simultaneously. Steps may also be added or also omitted unless otherwise stated.

In response to a search query, one or more of the first and second search result identifiers 320 and 336 may be displayed on the map 300 or floor selector interface 330. Such identifiers may include location information, as well as elevation information for each of the corresponding search results.

As shown in FIG. 3A, a plurality of second search result identifiers 336 are displayed in the floor selector interface 330, indicating the existence of search results on various floors of the multi-story building. In the example shown in FIG. 3A, there are search result identifiers 336 on the floor selectors 332 corresponding to floors B, 1, and 2, indicating the existence of search results on those floors of the building.

As also shown in FIG. 3A, the floor selector 322 corresponding to floor 1 of the building is selected. Accordingly, the floor selector 322 corresponding to floor 1 appears with a different transparency, or semi-transparency, than the other floor selectors 322. In addition, certain of the search result identifiers 320 appear with a different transparency, or semi-transparency, than others. For example, in FIG. 3A, search result identifiers 320 labeled A, B, C, D, and E appear in a non-transparent state, while search result identifiers 321 labeled F, G, H, I, and J appear in a semi-transparent state. In this example, search result identifiers 320 labeled A, B, C, D, and E are on floor 1, which is the selected floor, while search result identifiers 321 labeled F-J are on other floors of the multi-story building, e.g., floors not currently selected at the floor selector interface 330. The difference in transparency indicates to a user that those semi-transparent identifiers are on non-selected floors.

The device may also determine its current location, including current elevation, and display such information on the map 300 or floor selector interface 330. As also shown in FIG. 3A, the first location identifier 310 is displayed at the normal transparency, since the device is currently located on the floor selected at the floor selector interface 330, e.g., floor 1. The location of the device may also be indicated with a second location identifier 334 in the floor selector interface. For example, the second location identifier 334 may be a symbol having a common characteristic with the first location identifier 310. As discussed above, a user may easily associate the first location identifier with the second location identifier. For example, if a user is familiar with either of the first or second location identifier, but it unfamiliar with the other, the user may be able to easily associate the two based on the common characteristic. Some other examples of a common characteristic include, for example, color, shape, etc.

As shown in FIG. 3B, floor B is now selected. As a result, the search result identifiers 320 labeled A-E are now in a semi-transparent state, since they are on floor 1 and floor 1 is no longer selected at the floor selector interface 330. In addition, search result identifiers 322 labeled F, I, and J are now in a non-transparent state. This indicates that the search results of F, I, and J exist on the B level of the building.

As also shown in FIG. 3B, the first location identifier 310 now appears in a semi-transparent state. This indicates that the user's device is located on a floor which is not currently selected by the floor selector interface 330. Additionally, the second location identifier 334 remains on the floor selector 332 for floor 1, indicating that the user is still on floor 1.

The floor selector interface as described above may also be used in conjunction with a three-dimensional perspective view map, as shown in FIG. 4A. In this example, the map 400 includes a first location identifier 410, and a location range identifier 412, a floor selector interface 430, floor selector 432, and second location identifier 434, similar to as described above. In addition, the upper and lower floor selectors 432, in this example, are upper and lower floor indicators, indicating the existence of floors above and below the floors currently displayed by the floor selector interface 430.

The map 400 also includes upper and lower floor outlines 440 and 450. The upper floor outline 440 is displayed above the currently selected floor, indicating the existence of floors above the currently selected floor. In the same way, the lower floor outline 450 is displayed below the currently selected floor, indicating the existence of floors below the currently selected floor.

In the example of FIG. 4A, the floor selector 432 corresponding to floor 24 is selected, similar to the floor selection process described above. In this regard, the indoor floor plan of floor 24 is displayed on the map 400. The first location identifier 410 is displayed on the indoor floor plan corresponding to floor 24 and a second location identifier is displayed on the floor selector interface 530 at the floor selector corresponding to floor 24.

In FIG. 4B, the elevation, e.g., vertical height or floor number of a multi-story building, of the device is now on a floor below floor 21. This is indicated by the first location identifier 410 being displayed at the lower floor outline 450 as well as the second location identifier 434 being displayed at the lower floor indicator in the floor selector interface 430. Similarly, if a device is located above floor 21, the first location identifier 410 may be displayed at the upper floor indicator 440 and the second location identifier 434 may be displayed at the upper floor indicator in the floor selector interface 430.

In another example, the user's device may be on a floor corresponding to a floor currently displayed by the floor selector interface 430, but not currently selected, such as any of floors 21-23 or 25-28 in FIGS. 4A and 4B. In this example, the second location indicator may be displayed at the floor selector 432 corresponding to the device's current elevation or floor designation.

Figure 5:
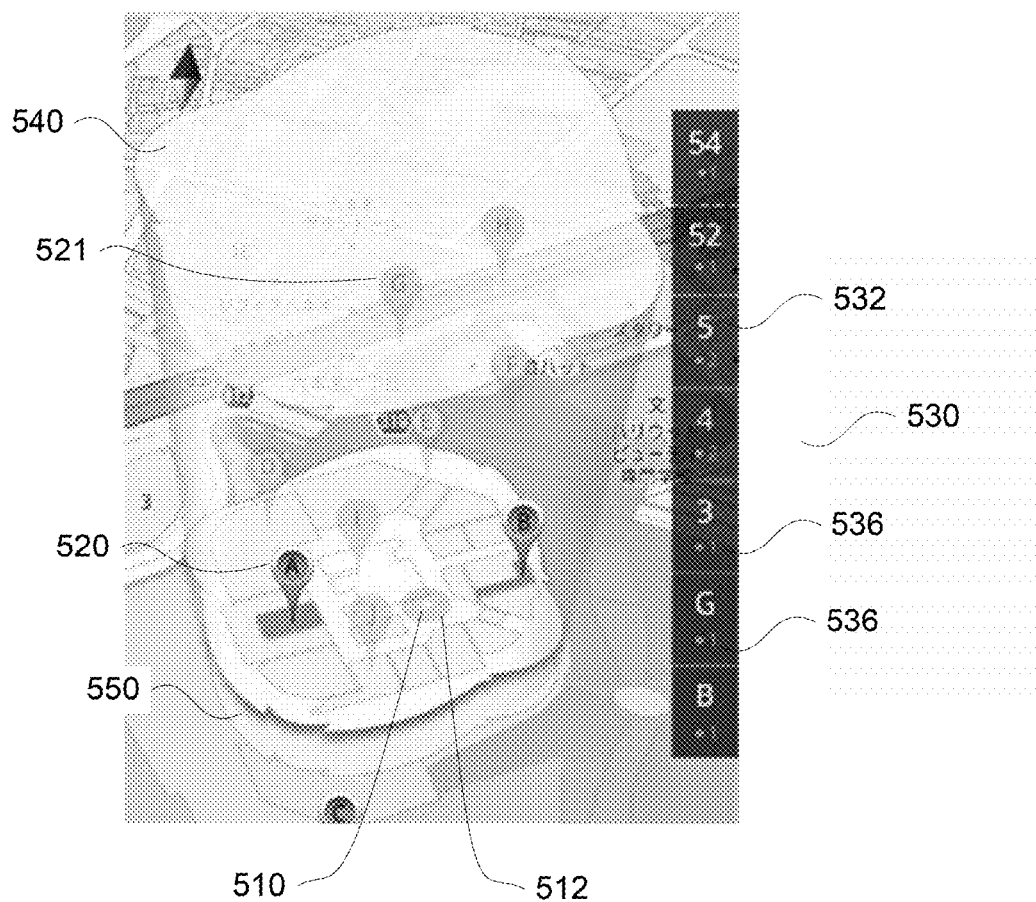
FIG. 5 is another pictorial diagram of a map according to aspects of the disclosure.

While FIGS. 3A and 3B show a plurality of search results in a two-dimensional plan view, such search results may also be displayed in a three-dimensional perspective map. FIG. 5 shows a pictorial view of a three-dimensional map 500 according to one aspect of the disclosure. In this example, the map 500 includes a first location identifier 510, location range identifier 512, and upper and lower floor outlines 540 and 550 similar to described above. Additionally, a plurality of search result identifiers 520 are displayed on the three-dimensional map 500. As shown, identifiers 520 labeled A and B correspond with a currently selected floor in the floor selector interface 530, e.g., floor 4. The identifiers 520 may be displayed in such a way so as to indicate their elevation on the map 500. For example, the identifiers 521 corresponding to F, G, and H are displayed in the space between the indoor floor plan and the upper floor indicator. This allows a user to understand that such search results may be located on floors above the selected floor.

In the example of FIG. 5, the floor selector interface 530 may display a number adjacent the second search result identifier 536. This number may correspond to a number of search results that exist on the corresponding floor. Additionally, in this example, the floor selectors 532 may all have the same transparency, irrespective of selection status. Instead, the number displayed at each floor selected may change color based on selection status. For example, the selected floor number may be displayed as yellow while the non-selected floors may be displayed as white.

Figure 6A:
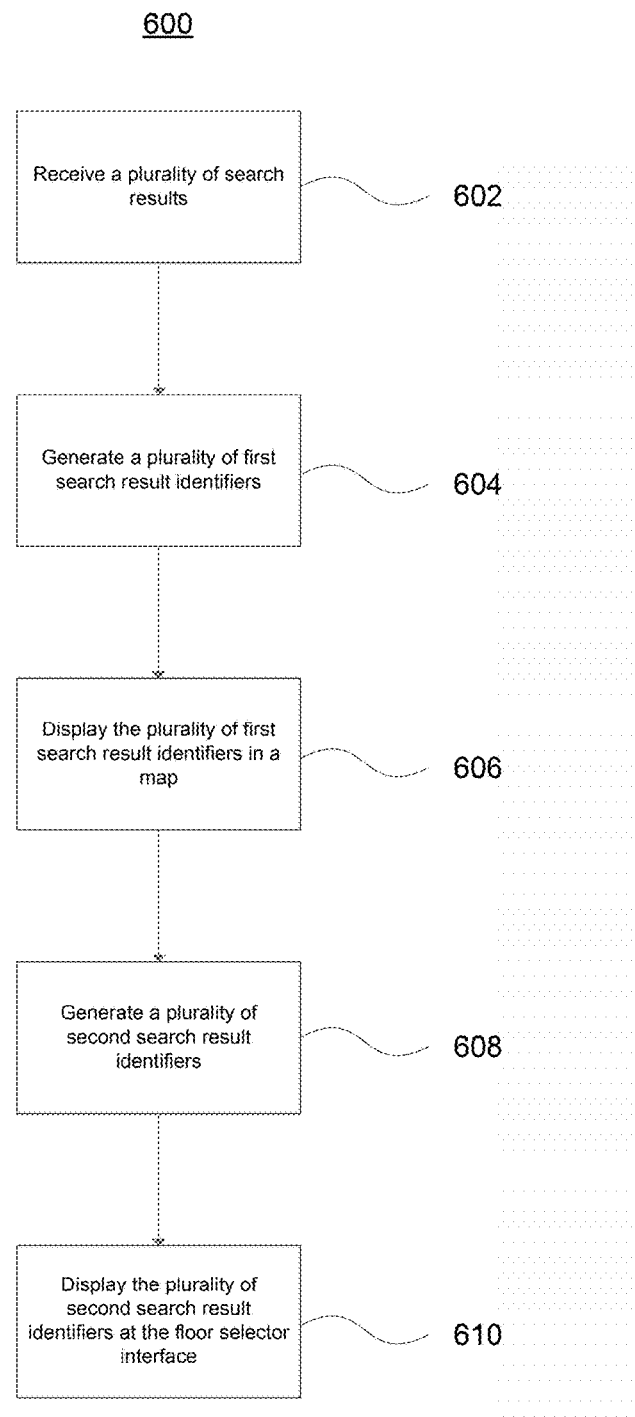
FIGS. 6A-6B are flow charts depicting methods of displaying search results according aspects of the disclosure.

FIG. 6A is a flow chart depicting a method 600 of displaying search results according aspects of the disclosure.

At block 602, a plurality of search results may be received. This may be in response to a search query, for example, devices 130 or 110 may receive search results in response to a user executing a search query for shoes while in a mall. The search results may include information relating to a location and elevation of each of the plurality of search results. For example, if the search result is a store or business (e.g., shoe store or shoe department within a store) in a multi-story building, the location information may include the location on an indoor floor plan of the store or business, as well as the elevation (e.g., floor number) within the multi-story building, such as a department store or mall.

At block 604, a processor, such as any of the processors described above with respect to the system 100, may generate a plurality of the first search result identifiers. Each of the plurality of first search result identifiers may correspond to a respective one of the plurality of search results. For example, shoe stores and departments returned as search results may be identified by a plurality of colored pins.

At block 606, the plurality of first search result identifiers may be displayed in a map. A first group of the first search result identifiers at a first elevation may be displayed differently than a second group at a second elevation depending on the current selection of the floor selector interface. For example, the pins correlating to shoe stores on the currently selected floor may be non-transparent whereas the pins correlating to shoe stores on another floor may be semi-transparent.

At block 608, a processor may generate a plurality of second search result identifiers. Each of the second search result identifiers may correspond to one of the first group and the second group of the first search result identifiers. For example, the shoe stores returned as search results may be displayed as a circle and number on the floor selector interface in addition to the pins on a map.

At block 610, the plurality of second search result identifiers may be displayed at the floor selector interface and each of the second search result identifiers may have a common characteristic with at least one of the first search result identifiers. For example, the identifier on the map and the identifier on the floor selector interface may be the same shape or color (e.g., circular red pin and circular red dot).

Figure 6B:
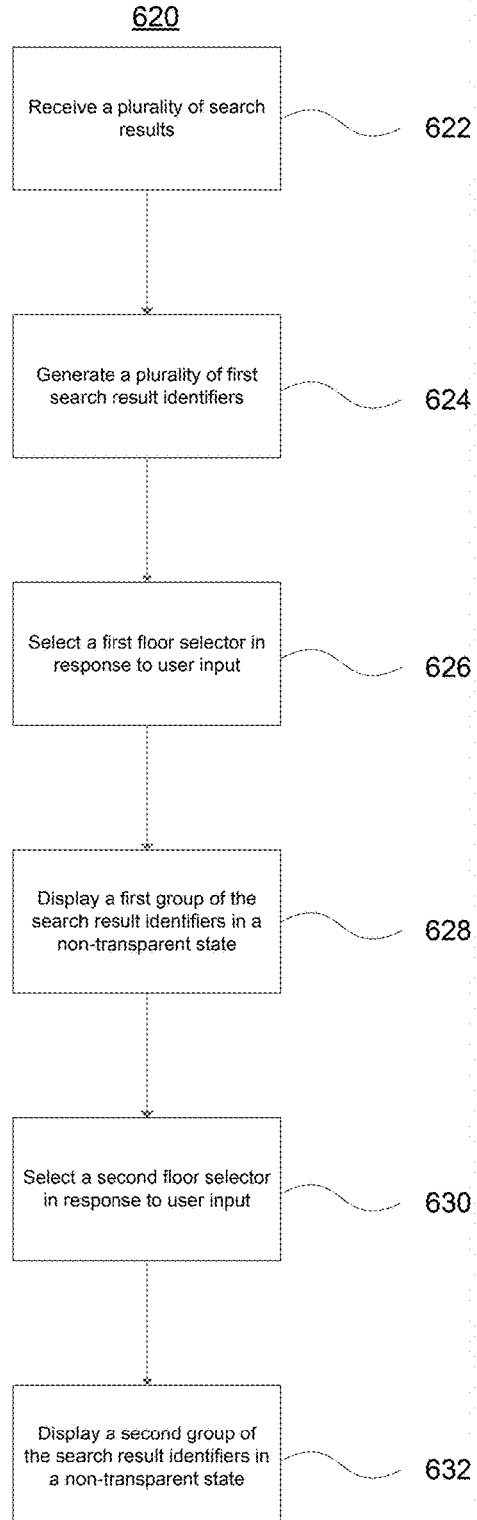

FIG. 6B is a flow chart 620 depicting a method of displaying a plurality of search results according to aspects of the disclosure.

At block 622, a plurality of search results may be received. This may be in response to a search query, for example, devices 130 or 110 may receive a search results in response to a user executing a search query for shoes while in a mall. The search results may include information relating to a location and elevation of each of the plurality of search results. For example, if the search result is a store or business (e.g., shoe store or shoe department within a store) in a multi-story building, the location information may include the location on an indoor floor plan of the store or business, as well as the elevation (e.g., floor number) within the multi-story building, such as a department store or mall.

At block 624, a processor, such as any of the processors described above with respect to the system 100, may generate a plurality of the first search result identifiers. Each of the plurality of first search result identifiers may correspond to a respective one of the plurality of search results. For example, each of the plurality of pins may identify a shoe store or shoe department within a store.

At block 626, a first floor selector may be selected in response to a user input. For example, a user may provide gesture input to a device, as described above. The gesture input may cause the floor selector to change transparency, indicating that it has been selected.

At block 628, a first group of the search result identifiers may be displayed in a non-transparent state. This may indicate that the first group of search result identifiers correspond with the selected floor. For example, all the pins corresponding to the shoe stores on the currently selected floor will be non-transparent.

At block 630, a second floor selector may be selected in response to a user input. The second floor selector may be different from the first floor selector, and in one example may represent a different floor of a multi-story building.

At block 632, a second group of the search result identifiers may be displayed in a non-transparent state. This may indicate that the second group of search result identifiers may correspond with the selected floor. For example, when you select the second floor all the pins correlating to the shoe stores on the second floor become non-transparent.

Figure 7A:
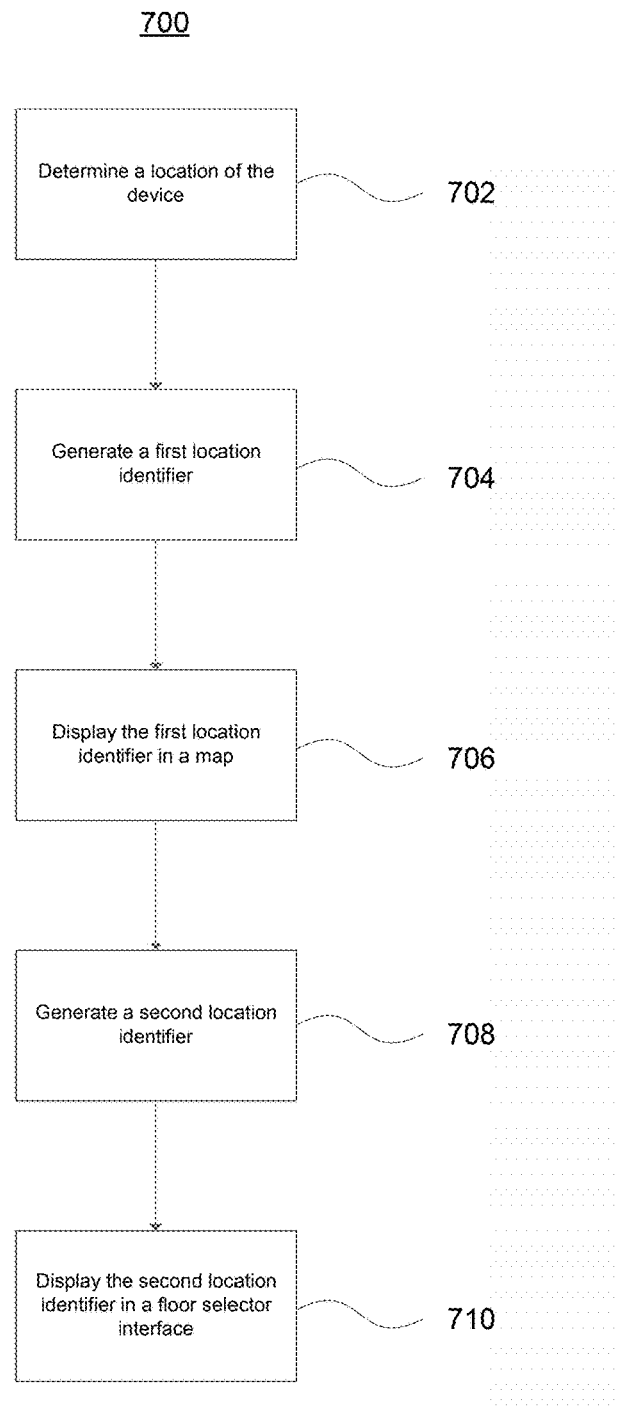
FIGS. 7A-7B are flow charts depicting methods of displaying a location of a device according aspects of the disclosure.

FIG. 7A is a flow chart depicting a method 700 of displaying a location of a device according to aspects of the disclosure.

At block 702, a location of the device may be determined. The location may include elevation information, e.g., present floor of a multi-story building.

At block 704, a processor may generate a first location identifier. The first location identifier may be an arrow, for example, which may be used to indicate the location and/or orientation of a device in a mall.

At block 706, the first location identifier may be displayed in a map. The first location identifier may correspond to a location of the device and may be displayed at a predetermined transparency based on a current selection of the floor selector interface. For example, the arrow representing the location and/or orientation of the device may be non-transparent if being displayed on the currently selected floor of a mall.

At block 708, a processor may generate a second location identifier corresponding to the location of the device. For example, the second location identifier may also correspond to device location but may be displayed as a small colored circle at the periphery of the map as opposed to a pin.

At block 710, the second location identifier may be displayed in the floor selector interface and the second location identifier may have a common characteristic with the first location identifier. For example, there may be a colored arrow on the map and a circle of the same color on the floor selector interface at the periphery of the map.

Figure 7B:
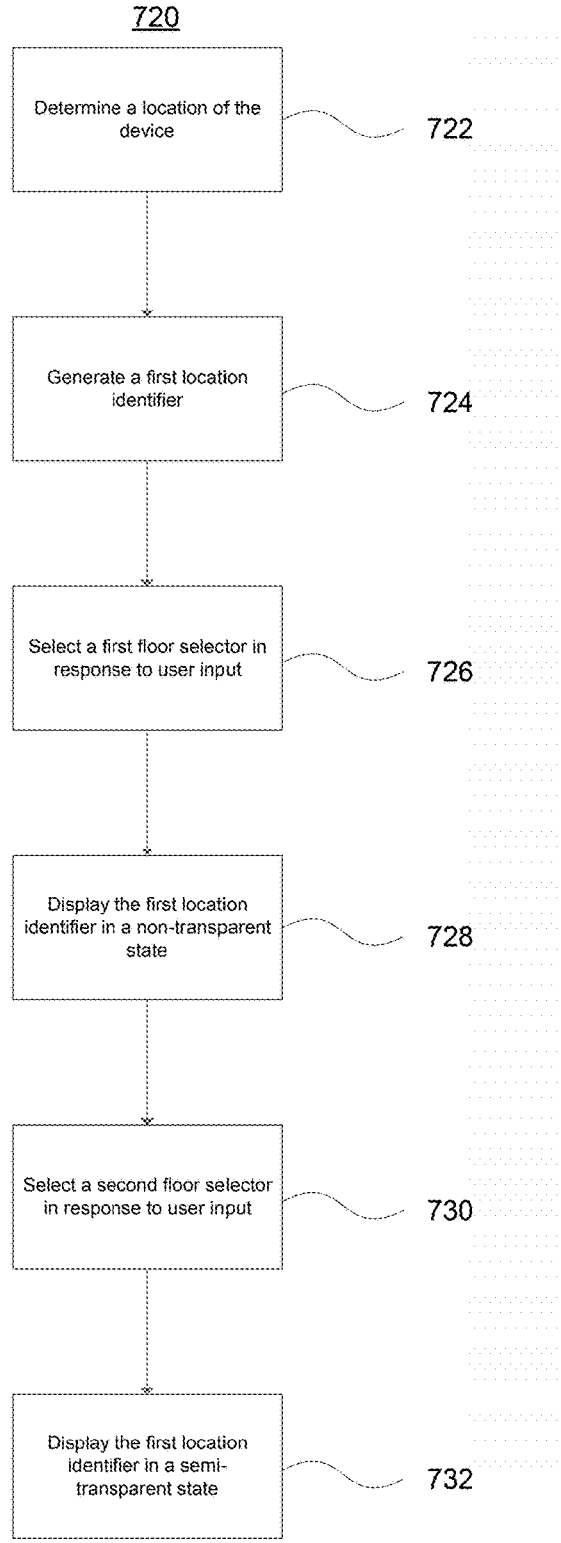

FIG. 7B is a flow chart 720 depicting a method of displaying location of a device according to aspects of the disclosure.

At block 722, a location of the device may be determined. The location may include elevation information, e.g., present floor of a multi-story building.

At block 724, a processor may generate a first location identifier corresponding to the location of the device.

At block 726, a first floor selector may be selected in response to a user input. For example, a user may provide gesture input to a device, as described above. The gesture input may cause the floor selector to change transparency, indicating that it has been selected.

At block 728, the first location identifier may be displayed in a non-transparent state. This may occur when the first location identifier corresponds to the first floor selector, which is currently selected. For example, the arrow may be displayed non-transparently if it is on the currently selected floor.

At block 730, a second floor selector may be selected in response to a user input.

At block 732, the first location identifier may be displayed in a semi-transparent state. For example, the arrow displayed at a lower floor may now appear semi-transparent because a different floor is selected.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method for displaying locations of user devices in a multi-story building, comprising:
   obtaining, via one or more processors, a location estimate of a user device, the location including elevation information;
   generating, via the one or more processors, a first location identifier for display in a map, the first location identifier corresponding to the location estimate of the user device;
   generating, via the one or more processors, a floor selector interface, the floor selector interface including a plurality of floor selectors each corresponding to one or more floors of a multi-story building, the floor selector interface being arranged adjacent to an edge of the map to indicate some or all of the floors in the multi-story building;

generating, via the one or more processors, a second location identifier for display in the floor selector interface, the second location identifier corresponding to the location estimate of the user device based on the obtained elevation information and indicating a floor on which the user device is located in the multi-story building; and providing, for presentation on a display of the user device, the first location identifier in the map and the second location identifier in the floor selector interface;

wherein the second location identifier has a common characteristic with the first location identifier, the common characteristic identifying a correspondence between the first and second location identifiers to indicate that both the first and second location identifiers provide information regarding a current physical location of the user device in the multi-story building.

2. The method of claim 1, wherein generating the floor selector interface includes arranging the floor selector interface to extend vertically along a viewable portion of the display of the user device.

3. The method of claim 1, wherein the common characteristic is a color or a shape of the first and second location identifiers.

4. The method of claim 1, further comprising:
generating, via the one or more processors, one or more first search result identifiers and one or more second search result identifiers indicating a set of search results responsive to a query;
providing, for display in the map, the one or more first search result identifiers; and
providing, for display in the floor selector interface, the one or more second search result identifiers;
wherein the one or more second search result identifiers provided for display in the floor selector interface correspond to the one or more first search result identifiers provided for display in the map.

5. The method of claim 1, further comprising:
changing a current floor selection of the floor selector interface; and
changing a transparency of the first location identifier in response to changing the current floor selection.

6. The method of claim 5, further comprising changing a transparency of the second location identifier in response to changing the current floor selection.

7. The method of claim 1, wherein:
the first location identifier is provided for display non-transparently when the first location identifier corresponds to a current floor selection; and
the first location identifier is provided for display semi-transparently when the first location identifier corresponds to a floor selection different from the current floor selection.

8. The method of claim 1, further comprising scanning through some or all of the plurality of floor selectors in response to a received input.

9. The method of claim 1, wherein generating the first location identifier includes generating a location range identifier encompassing the first location identifier, the location range identifier indicating a certainty of the location estimate.

10. The method of claim 9, wherein the location range identifier completely encircles the first location identifier.

11. The method of claim 1, wherein the floor selectors located at either end of the floor selector interface are arranged to display respective symbols indicating the existence of additional floors in the multi-story building.

12. A system for displaying for displaying a location of a user device in a multi-story building, the system comprising:
one or more processors; and
a memory coupled to the one or more processors, the memory including instructions to cause the one or more processors to:
obtain a location estimate of a user device, the location including elevation information;
generate a first location identifier for display in a map, the first location identifier corresponding to the location estimate of the user device;
generate a floor selector interface, the floor selector interface including a plurality of floor selectors each corresponding to one or more floors of a multi-story building, the floor selector interface being arranged adjacent to an edge of the map to indicate some or all of the floors in the multi-story building;
generate a second location identifier for display in the floor selector interface, the second location identifier corresponding to the location estimate of the user device based on the obtained elevation information and indicating a floor on which the user device is located in the multi-story building; and
provide, for presentation on a display of the user device, the first location identifier in the map and the second location identifier in the floor selector interface;
wherein the second location identifier has a common characteristic with the first location identifier, the common characteristic identifying a correspondence between the first and second location identifiers to indicate that both the first and second location identifiers provide information regarding a current physical location of the user device in the multi-story building.

13. The system of claim 12, wherein the memory includes instructions to cause the one or more processors to:
generate one or more first search result identifiers and one or more second search result identifiers indicating a set of search results responsive to a query;
provide, for display in the map, the one or more first search result identifiers; and
provide, for display in the floor selector interface, the one or more second search result identifiers;
wherein the one or more second search result identifiers provided for display in the floor selector interface correspond to the one or more first search result identifiers provided for display in the map.

14. The system of claim 12, wherein the memory includes instructions to cause the one or more processors to:
change a current floor selection of the floor selector interface; and
change a transparency of the first location identifier in response to the change in the current floor selection.

15. The system of claim 12, further comprising the display of the user device, the display being operatively coupled to the one or more processors.

16. The system of claim 12, wherein the one or more processors are configured to obtain the location estimate of the user device by determining latitude, longitude, and altitude of the user device according to coordinates received from a geographic positioning system.

17. The system of claim 12, wherein the one or more processors are further configured to generate a location range identifier to encompass the first location identifier, the location range identifier indicating a certainty of the location estimate.

18. A non-transitory computer readable recording medium recorded with instructions that, when executed by one or more processors, cause the one or more processors to perform a method for displaying locations of user devices in a multi-story building, the method comprising:

obtaining a location estimate of a user device, the location including elevation information;

generating a first location identifier for display in a map, the first location identifier corresponding to the location estimate of the user device;

generating a floor selector interface, the floor selector interface including a plurality of floor selectors each corresponding to one or more floors of a multi-story building, the floor selector interface being arranged adjacent to an edge of the map to indicate some or all of the floors in the multi-story building;

generating, a second location identifier for display in the floor selector interface, the second location identifier corresponding to the location estimate of the user device based on the obtained elevation information and indicating a floor on which the user device is located in the multi-story building; and providing, for presentation on a display of the user device, the first location identifier in the map and the second location identifier in the floor selector interface;

wherein the second location identifier has a common characteristic with the first location identifier, the common characteristic identifying a correspondence between the first and second location identifiers to indicate that both the first and second location identifiers provide information regarding a current physical location of the user device in the multi-story building.

19. The non-transitory computer readable recording medium of claim 18, wherein the method further comprises:

generating one or more first search result identifiers and one or more second search result identifiers indicating a set of search results responsive to a query;

providing, for display in the map, the one or more first search result identifiers; and providing, for display in the floor selector interface, the one or more second search result identifiers;

wherein the one or more second search result identifiers provided for display in the floor selector interface correspond to the one or more first search result identifiers provided for display in the map.

20. The non-transitory computer readable recording medium of claim 18, wherein the method further comprises:

changing a current floor selection of the floor selector interface; and changing a transparency of the first location identifier in response to changing the current floor selection.

\* \* \* \* \*